United States Patent [19]

Hickey et al.

[11] 4,283,963
[45] Aug. 18, 1981

[54] BEARING CAP RETAINER FOR AUTOMOTIVE DIFFERENTIAL UNIT

[75] Inventors: John L. Hickey; Gerald A. Wuest, both of Fort Wayne, Ind.

[73] Assignee: Dana Corporation, Toledo, Ohio

[21] Appl. No.: 2,657

[22] Filed: Jan. 11, 1979

[51] Int. Cl.³ .................. F16C 35/04; F16H 35/08
[52] U.S. Cl. .................. 74/400; 308/207 R; 308/177; 74/424
[58] Field of Search .............. 308/177, 207 R, 207 A, 308/189 A, 216, 189 R, 206; 74/713

[56] References Cited

U.S. PATENT DOCUMENTS

| | | | |
|---|---|---|---|
| 1,057,861 | 4/1913 | Lockwood | 308/207 A |
| 2,609,710 | 9/1952 | Osborn | 74/713 |
| 3,770,994 | 11/1973 | Smith | 308/207 |
| 3,934,957 | 1/1976 | Derner | 308/207 A |
| 4,023,868 | 5/1977 | Miki | 308/207 A |
| 4,085,984 | 4/1978 | Cameron | 308/207 A |

*Primary Examiner*—Lenard A. Footland
*Attorney, Agent, or Firm*—Wilson, Fraser, Barker & Clemens

[57] ABSTRACT

An automotive differential has a differential case or rotor (20) rotatably mounted in a differential carrier (10) by a pair of spaced anti-friction bearings (30). The axial position of each of the anti-friction bearings is adjustable by virtue of a semi-cylindrical bearing retainer cap (40) which has an outer end face (40a) engaging an internally projecting shoulder (10c) in the stationary differential carrier and is provided with axially elongated slots (40c) for reception of mounting bolts (41) which engage threaded holes provided in the carrier adjacent a semi-cylindrical bore (10a) therein which functions as the other half of the bearing housing and which is machined with the bearing retainer in assembled position, thus permitting precise axial location of the bearing to permit axial positioning of the differential rotor relative to the carrier by a few shims (50) or an adjusting washer (60) to eliminate end play therebetween.

4 Claims, 6 Drawing Figures

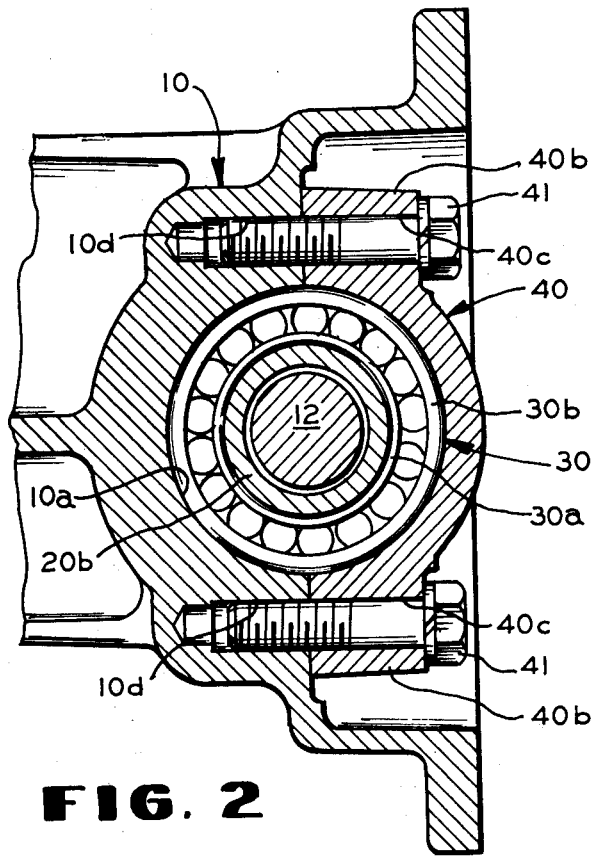
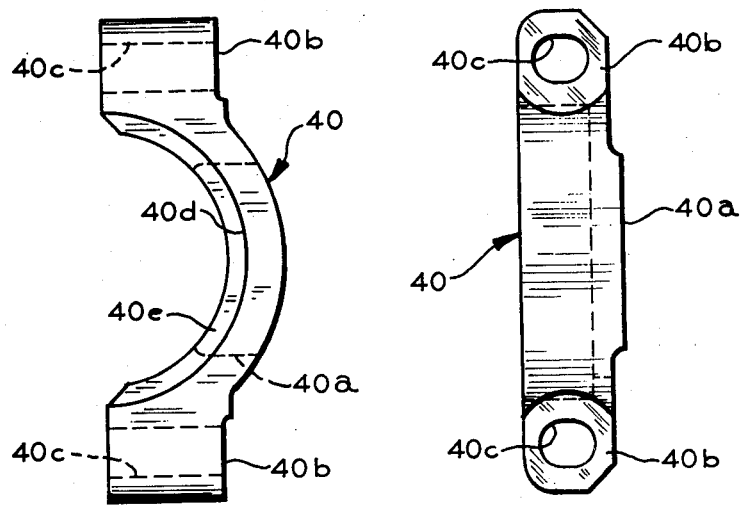
FIG. 2
FIG. 3  FIG. 4

BEARING CAP RETAINER FOR AUTOMOTIVE DIFFERENTIAL UNIT

DESCRIPTION

1. Technical Field

This invention relates in general to automotive differential units and, in particular, to an automotive differential unit having an adjustable bearing mounting assembly for eliminating the end play between the differential carrier and the differential rotor.

2. Background Art

Automotive differential units are very well known in the prior art and improvements therein in recent years have been directed to modifications which effect either a simplification of the manufacture, or the assembly of such differential units with an attendant reduction in cost. One of the persistent problems in the assembly of the automotive differential units is the mounting of the bearings for the differential case or rotor in such fashion that end play of the rotor is eliminated, and, at the same time, proper engagement of the ring gear carried by the rotor with the driving pinion is effected. Fairly complicated structures, for example, as illustrated by the disclosure of U.S. Pat. No. 3,770,994 issued Nov. 6, 1973 to Claude A. Smith, have heretofore been proposed for effecting the axially adjustable mounting of such bearing units. Unfortunately, the prior art attempts to resolve this problem has generally resulted in a unit involving increased costs either in manufacture of components or the assembly thereof.

Additionally, prior art bearing units for differentials suffered from a lack of stiffness of the bearing under heavy load conditions. A portion of the bearing, generally the bearing cap, would shift under heavy load transmission and thus destroy the optimum alignment position of the gears that existed under no load or moderate load conditions.

DISCLOSURE OF INVENTION

It is an object of this invention to provide an adjustable bearing mounting assembly for an automotive-type differential unit wherein the elimination of end play between the differential carrier and the rotor may be effected while at the same time assuring proper meshing engagement of the ring gear carried by such meshing engagement of the ring gear carried by such carrier with the driving pinion.

A further object of this invention is to provide an economical bearing assembly for an automotive differential unit wherein a semi-cylindrical bearing cap retainer of each bearing unit is provided with a non-machined end surface that is abuttable with a pre-located non-machined, internally projecting radial shoulder in the stationary differential carrier or housing; the assemblage of the bearing cap retainer to the carrier in surrounding relationship to the bearing is effected by a pair of bolts respectively passing through axially elongated slots provided in the bearing cap retainer, and the bore in which the bearing is mounted is machined with the bearing cap preassembled on the differential housing by the bolts engaging threaded holes in the housing.

With the bearing cap rigidly abutting the internally projecting radial shoulder in the stationary differential carrier, the stiffness of the bearing assembly under load conditions is substantially improved. It is made more rigid and the possibility of deflection is reduced, thus maintaining the optimum alignment of the gears of the differential unit under heavy load transmission conditions.

Further objects and advantages of this invention will become apparent to those skilled in the art from the following description of a preferred embodiment of this invention, taken in conjunction with the annexed sheets of drawings.

BRIEF DESCRIPTION OF DRAWINGS

FIG. 2 is a sectional view taken on the plane 2—2 of FIG. 1.

FIG. 3 is a side elevational view of a bearing cap retainer employed in the assemblage of FIG. 1.

FIG. 4 is a bottom plan view of FIG. 3.

BEST MODE FOR CARRYING OUT THE INVENTION

Figure 1:
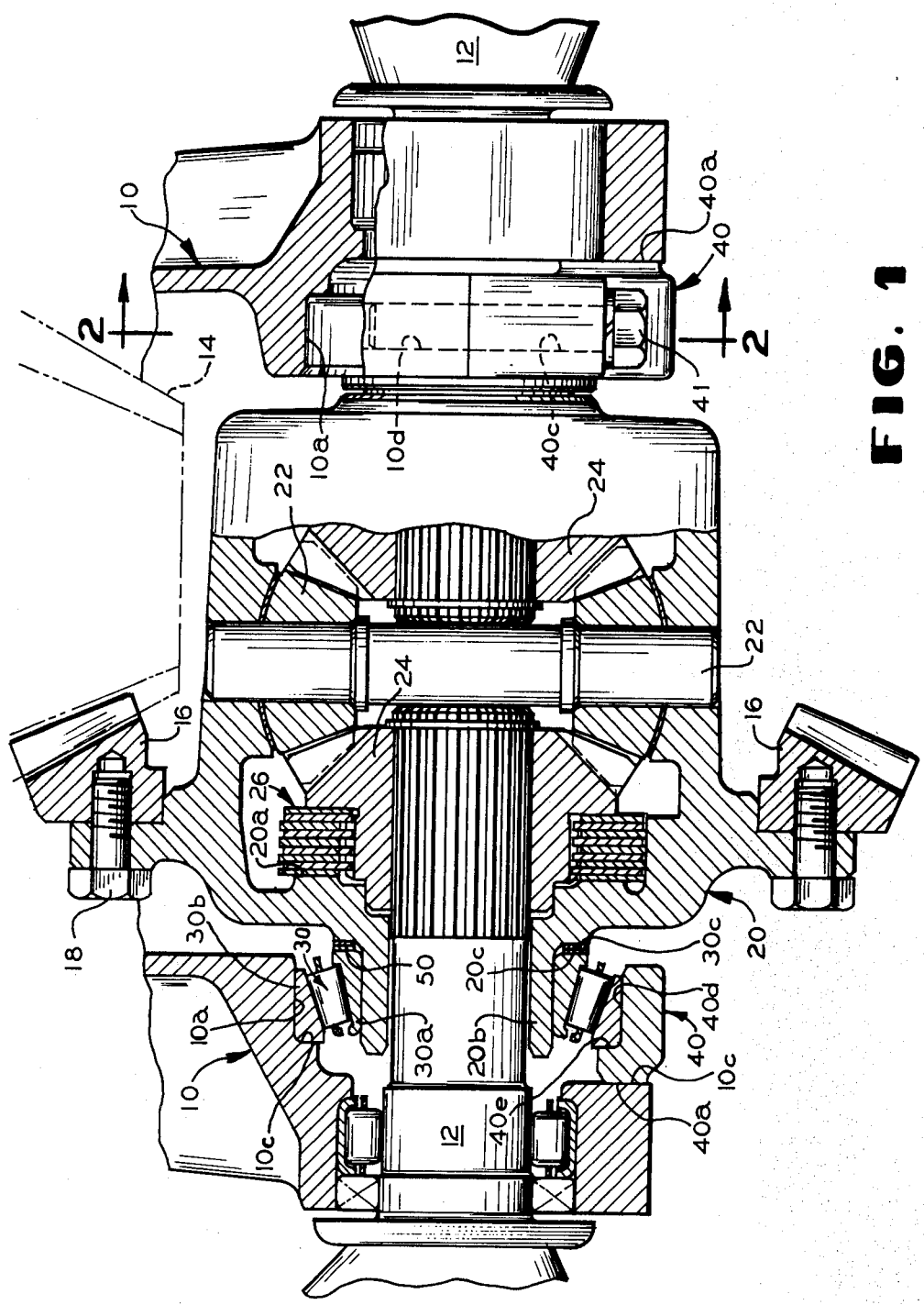
FIG. 1 is an axial sectional view of a portion of an automotive differential having a differential rotor rotatably mounted in a differential housing in accordance with our invention.

Referring now to the drawings and more specifically to FIG. 1, a typical automotive differential unit includes stationary differential housing 10 assembled in conventional fashion in surrounding relationship to the rear wheel axle drive shafts 12 and power input pinion 14. Pinion gear 14 is secured on the end of a drive shaft (not shown) and meshes with a ring gear 16 which is secured by bolts 18 to the periphery of a differential rotor or case 20. The differential rotor or case 20 is, with the exception of the manner in which it is finally assembled in the differential housing 10, an entirely conventional construction and as illustrated as including a plurality of planetary gears 22 which respectively mesh with the opposed output gears 24 respectively secured to axle shafts 12. Interposed between each output gear 24 and an adjacent annular radial wall 20a of the differential case 20, is a limited slip clutch 26 of the conventional pre-loaded spring type which minimizes excessive slipping of one wheel relative to the other.

The differential rotor 20 terminates at each lateral end with a cylindrical protuberance or hub 20b which is snugly engaged by the inner race 30a of a pre-assembled anti-friction bearing unit 30 which effects the rotatable mounting of that end of the rotor 20 in a semi-cylindrical recess 10a provided in the stationary differential housing 10. Axially outward of recess 10a the housing 10 is provided with a semi-circular non-machined radial end wall 10c, which engages a non-machined, as cast, end face 40a of a semi-cylindrical bearing cap retainer 40 which snugly surrounds the exposed half of the outer race 30b of the anti-friction bearing unit 30. This engagement thus determines the axial position of the anti-friction bearing unit 30 relative to the stationary differential housing 10. Those skilled in the art will recognize, however, that through an accumulation of casting and machining tolerances, it is unlikely that if the axial location of the differential rotor 20 were determined solely by the engagement of the bearing retaining cap 40 with the radial end wall 10c that there would not be end play of the rotor 20 within the housing 10, or even sufficiently accurate axial positioning thereof to produce proper engagement of the ring gear 16 with the pinion gear 14. For this reason, each anti-friction bearing unit 30, and cooperating retainer cap 40 is constructed and assembled in the manner specifically illustrated in FIGS. 2 through 5 of the drawings.

The bearing cap retainer 40 is secured to the bottom portion of the stationary differential housing 10 adjacent the semi-cylindrical bore 10a therein, by a pair of bolts 41 which respectively engage threaded holes 10d provided in the housing 10. Laterally projecting integral mounting pads 40b are provided on each end of the semi-cylindrical bearing cap retainer 40 and, in accordance with this invention, the mounting pads 40b are provided with axially elongated or oval shaped apertures 40c to respectively receive the bolts 41 and thus effect the rigid mounting of the bearing cap retainer 40 to the stationary differential housing 10 with the end surface 40a of the bearing cap retainer 40 in snug engagement with the internally projecting radial surface 10c provided on the stationary differential 10, irrespective of casting errors, or accumulation of tolerances.

Additionally, this elongated configuration of the bolt holes 40c in the bearing retainer cap 40 permits the cap 40 to be pre-assembled to the stationary differential housing 10, and the semi-cylindrical bore 10a in the differential housing 10, and the cooperating semi-cylindrical bore 40d in the bearing cap retainer 40 are concurrently machined. This insures a snug, accurately aligned fit of the outer race 30b of the anti-friction bearing unit 30 in the semi-cylindrical bore 10a in the differential housing 10 and the semi-cylindrical bore 40d provided in the bearing cap retainer 40, as well as solid axial location of each bearing 30 relative to housing 10.

The bearing cap retainer 40 is then removed. The hub portion 20a of the differential rotor 20 is then inserted within the bore of the inner race 30a of the anti-friction bearing unit 30 and, in accordance with the modification of FIGS. 1-4, a number of shims 50 are inserted between the radially inward end wall 30c of the anti-friction bearing unit 30, and an annular side wall 20c provided on the rotor housing 20. An identical assembly procedure is performed on the other side of the differential rotor 20 and a substantially equal number of circular shims 50 are inserted in the same relative position between the anit-friction bearing unit 30 on such other side, and the corresponding radial side wall (not shown) corresponding to side wall 20c. Bearing units 30 are then inserted in the semi-cylindrical housing bores 10a, abutting end walls 10e. Retainer caps 40 are then applied to the exposed portions of bearing units 30 and bolts 41 are tightened. Since each bearing unit 30 is firmly secured against any axial displacement by the fact that the bearing cap retainer 40 has its end surface 40a in abutment with the internally projecting radial surface 10c on the differential housing 10, it is apparent that the insertion of enough shims 50 effectively eliminates end play of the rotor 20 relative to the differential housing 10.

Additionally, the rigid abutment of the bearing cap retainer 4 against the radial surface 10c of the differential housing 10 provides a rigid bearing which will not deflect or shift its position whenever heavy loads are transmitted through a differential unit.

The reason for employing a substantially equal number of shims 50 on each side of the rotor unit 20 is to provide a convenient means for insuring the accurate inter-engagement of the ring gear 16 with the power input pinion gear 14. If, after the described assemblage is completed, the teeth engagement between pinion gear 14 and ring gear 16 is not exactly in the required relative position, one or more of the shims 50 are removed from one side of the rotor unit 20 and inserted on the opposite side of the rotor unit 20, thus effectively axially shifting the position of the teeth of ring gear 16 relative to the teeth of pinion gear 14 without, in any manner, introducing end play in the differential rotor 20 relative to the stationary differential housing 10.

Figure 5:
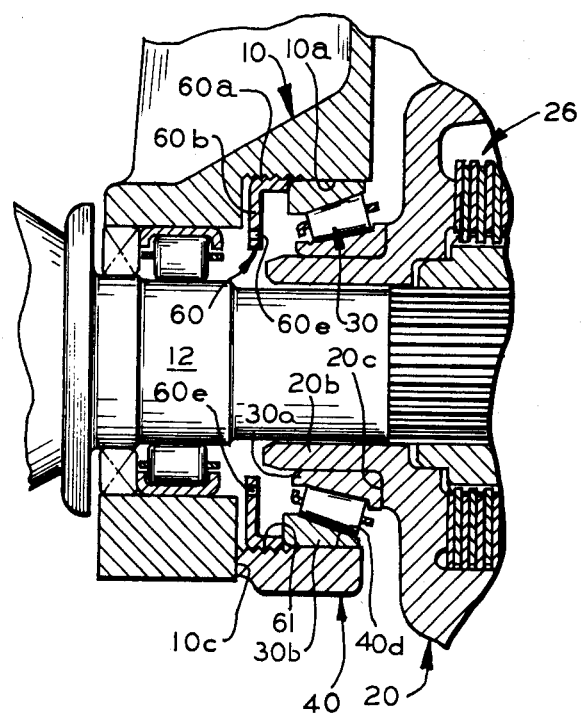
FIG. 5 is a view similar to FIG. 1 but showing an alternative apparatus for adjusting the axial position of the bearing unit for the differential rotor relative to the stationary housing.
Figure 6:
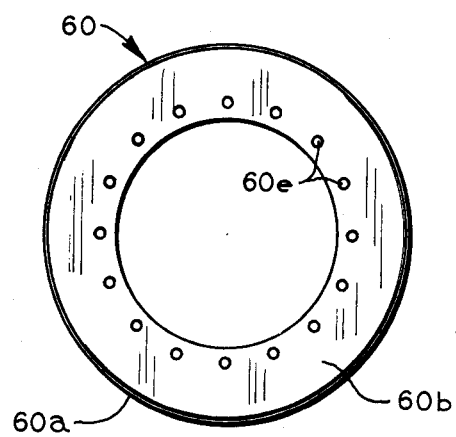
FIG. 6 is a plan view of the adjusting collar employed in the apparatus of FIG. 5.

Referring now to FIGS. 5 and 6 there is shown a modified construction embodying this invention wherein an annular washer 60 is provided having a threaded periphery 60a cooperating with internal threads 61 in the semi-cylindrical bores 10a and 40d respectively formed in the stationary housing 10 and the bearing cap 40. Such threads 61 may be machined at the same time that the bores 40d and 10a are machined which, as it will be recalled, is during the pre-assembly of the bearing cap retainer unit 40 to the stationary housing 10.

The adjusting washer 60 is of L-shaped cross-section and the radial portion 60b thereof is provided with a plurality of circumferentially spaced holes 60e which may be conveniently engaged by a spanner wrench to effect the rotation of the threaded washer 60 relative to the housing 10, and hence effect adjustment of the axial position of the anti-friction bearing unit 30 so as to position the differential carrier unit 20 in an axial position providing optimum engagement between the teeth of the ring gear 16 and the teeth of the driving pinion 14. In this modification, it will be noted that the same advantages are provided in that the end face 40a of bearing cap retainer unit 40 is abutting the radial end wall 10c of the housing 10 and hence preventing displacement or deflection of the anti-friction bearing unit 30 when high loads are being transmitted through the differential unit.

From the foregoing description, it is apparent that this invention permits the rapid, convenient and accurate mounting of the rotor unit of an automotive differential rotor in a proper axial position relative to the fixed differential housing to eliminate end play of the rotor. Concurrently, proper intermeshing engagement of the ring gear carried by the rotor with the power input pinion gear may be effected without, in any manner, introducing end play between the rotor unit and the stationary differential housing. No additional components are required but the bearing cap retainer is employed as the axial locating member for the differential rotor by virtue of the fact that the cylindrical bore accommodating the anti-friction bearing bore on each side of the differential rotor is machined with the bearing cap retainer bolted in place. The securement of the bearing cap retainer to the stationary differential housing for such machining is readily effected regardless of any accumulation of casting or machining tolerances by virtue of the provision of axially elongated bolt holes in the mounting pads for the bearing cap retainer.

The rigid engagement of the bearing cap retainer with an internally projecting radial wall of the stationary housing eliminates shifting or deflection of the bearing unit under load and thus maintains the various differential gears in their position of optimum alignment.

Modifications of this invention will be apparent to those skilled in the art, and it is intended that the scope of the invention be limited solely by the appended claims.

We claim:

1. A bearing mounting assembly for an automotive type differential having a stationary housing, a rotor disposed in said housing, a pair of axially spaced antifriction bearing means rotatably supporting and centering said rotor in said housing, each of said bearing means having one half of its circular periphery snugly mounted in a semi-cylindrical machined bore in said stationary housing, and the remainder of its periphery exposed, a pair of threaded bolt holes on opposite sides of each of said semi-cylindrical machined bores, a semi-circular radial surface on each said housing axially outwardly adjacent to each said exposed periphery, a bearing retaining cap of 180° peripheral configuration constructed and arranged to engage and enclose said exposed portion of each said anti-friction bearing, each said retaining cap having a radial end face constructed and arranged to abut one of said semi-circular radial surfaces on said housing in final assembly, said bearing retaining cap having a pair of axially enlongated bolt receiving slots for respective reception of a pair of bolts passing through said slots into said threaded holes in said stationary housing, and axially adjustable means for eliminating end play between said rotor and said housing.

2. The combination defined in claim 1 wherein said last mentioned means comprises a plurality of annular shims between each side of the rotor and the adjacent antifriction bearing means.

3. The combination defined in claim 2 plus a ring gear concentrically mounted on said rotor and engagable by a drive pinion, the depth of gear teeth engagement of said ring gear and pinion being adjusted by shifting one or more shims from one side of the rotor to the other.

4. The combination defined in claim 1 wherein the bore defined between said stationary housing and said retaining cap is machined with the respective retaining cap pre-assembled to said stationary housing by said bolts, and said axially adjusting means comprises internal threads produced in the axially outer end of said bore during said pre-assembly machining and an externally threaded washer engaging said bore threads to adjustably position the respective bearing means relative to said stationary housing.

* * * * *

UNITED STATES PATENT AND TRADEMARK OFFICE
CERTIFICATE OF CORRECTION

PATENT NO. : 4,283,963

DATED : August 18, 1981

INVENTOR(S) : John L. Hickey; Gerald A. Wuest

It is certified that error appears in the above—identified patent and that said Letters Patent are hereby corrected as shown below:

Column 5, line 12, omit the word "each".

Signed and Sealed this

Fifth Day of January 1982

[SEAL]

Attest:

Attesting Officer

GERALD J. MOSSINGHOFF

*Commissioner of Patents and Trademarks*